(12) United States Patent
Park et al.

(10) Patent No.: US 12,191,498 B2
(45) Date of Patent: Jan. 7, 2025

(54) LITHIUM SECONDARY BATTERY

(71) Applicant: LG CHEM, LTD., Seoul (KR)

(72) Inventors: Eunkyung Park, Daejeon (KR);
Minchul Jang, Daejeon (KR); Bora Jung, Daejeon (KR); Byoungkuk Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 816 days.

(21) Appl. No.: 16/982,093

(22) PCT Filed: Oct. 31, 2019

(86) PCT No.: PCT/KR2019/014582
§ 371 (c)(1),
(2) Date: Sep. 18, 2020

(87) PCT Pub. No.: WO2020/091453
PCT Pub. Date: May 7, 2020

(65) Prior Publication Data
US 2021/0104748 A1    Apr. 8, 2021

(30) Foreign Application Priority Data

Oct. 31, 2018  (KR) .................. 10-2018-0131662
Oct. 31, 2019  (KR) .................. 10-2019-0137138

(51) Int. Cl.
*H01M 4/62*      (2006.01)
*H01M 4/36*      (2006.01)
(Continued)

(52) U.S. Cl.
CPC .......... *H01M 4/628* (2013.01); *H01M 4/364* (2013.01); *H01M 4/366* (2013.01); *H01M 4/382* (2013.01);
(Continued)

(58) Field of Classification Search
CPC ...... H01M 4/628; H01M 4/364; H01M 4/366; H01M 4/382; H01M 4/525; H01M 4/622;
(Continued)

(56) References Cited

U.S. PATENT DOCUMENTS 6,255,020 B1    7/2001  Yamashita et al.
6,402,795 B1    6/2002  Chu et al.
(Continued)

FOREIGN PATENT DOCUMENTS

CN    103718337 A    4/2014
CN    105074968 A    11/2015
(Continued)

OTHER PUBLICATIONS

International Search Report issued in PCT/KR2019/014582 (PCT/ISA/210), dated Feb. 11, 2020.
(Continued)

*Primary Examiner* — Daniel S Gatewood
(74) *Attorney, Agent, or Firm* — Birch, Stewart, Kolasch & Birch, LLP

(57) ABSTRACT

A lithium secondary battery comprising a positive electrode, a negative electrode, a lithium metal layer, and an electrolyte disposed between the positive electrode and the negative electrode. The negative electrode comprises a first protective layer formed on a negative electrode current collector, a second protective layer formed on the first protective layer opposite the negative electrode current collector, and a third protective layer formed inside and on one surface of the second protective layer opposite the first protective layer, and wherein the lithium metal layer is formed between the negative electrode current collector and the first protective layer in the negative electrode when lithium ions migrate from the positive electrode after charging.

12 Claims, 3 Drawing Sheets

(51) Int. Cl.
*H01M 4/38* (2006.01)
*H01M 4/525* (2010.01)
*H01M 10/0525* (2010.01)

(52) U.S. Cl.
CPC ........... *H01M 4/525* (2013.01); *H01M 4/622* (2013.01); *H01M 10/0525* (2013.01)

(58) Field of Classification Search
CPC ........... H01M 10/0525; H01M 4/0445; H01M 4/131; H01M 4/134; H01M 4/1395; H01M 4/505; H01M 4/62; H01M 4/623; H01M 4/667; H01M 4/668; H01M 10/052; H01M 4/13; H01M 4/0447; H01M 10/446; Y02E 60/10
See application file for complete search history.

(56) References Cited

U.S. PATENT DOCUMENTS

| | | | |
|---|---|---|---|
| 6,576,371 | B1 | 6/2003 | Yasuda et al. |
| 9,680,181 | B2 | 6/2017 | Rhee et al. |
| 2002/0018935 | A1* | 2/2002 | Okada ................ H01M 4/0445 429/231.95 |
| 2004/0157124 | A1 | 8/2004 | Goh et al. |
| 2004/0209159 | A1 | 10/2004 | Lee et al. |
| 2005/0095504 | A1 | 5/2005 | Kim et al. |
| 2006/0102869 | A1 | 5/2006 | Cavaille et al. |
| 2006/0257737 | A1 | 11/2006 | Goh et al. |
| 2007/0221265 | A1* | 9/2007 | Affinito ................ H01M 4/628 136/243 |
| 2009/0162754 | A1 | 6/2009 | Cotton et al. |
| 2009/0317724 | A1 | 12/2009 | Kumar et al. |
| 2012/0094189 | A1 | 4/2012 | Scrosati et al. |
| 2013/0017441 | A1 | 1/2013 | Affinito et al. |
| 2013/0095380 | A1 | 4/2013 | Affinito et al. |
| 2013/0188294 | A1 | 7/2013 | Kim et al. |
| 2013/0260257 | A1 | 10/2013 | Choi |
| 2014/0011101 | A1 | 1/2014 | Ma et al. |
| 2014/0093774 | A1 | 4/2014 | Yoon |
| 2014/0147330 | A1 | 5/2014 | Lee et al. |
| 2014/0178777 | A1 | 6/2014 | Lee et al. |
| 2015/0295246 | A1 | 10/2015 | Son et al. |
| 2017/0104209 | A1 | 4/2017 | Son et al. |
| 2017/0133660 | A1 | 5/2017 | Kurihara et al. |
| 2017/0141402 | A1 | 5/2017 | Affinito et al. |
| 2017/0244093 | A1 | 8/2017 | Fan |
| 2017/0294671 | A1 | 10/2017 | Jin et al. |
| 2018/0034101 | A1 | 2/2018 | Lee et al. |
| 2018/0051137 | A1 | 2/2018 | Kim et al. |
| 2018/0053978 | A1 | 2/2018 | Song et al. |
| 2018/0197691 | A1 | 7/2018 | Song et al. |
| 2018/0294476 | A1* | 10/2018 | Zhamu ............... H01M 10/0565 |
| 2018/0301693 | A1 | 10/2018 | Choi et al. |
| 2018/0323430 | A1 | 11/2018 | Son et al. |
| 2019/0058185 | A1 | 2/2019 | Lee et al. |
| 2019/0067702 | A1 | 2/2019 | Son et al. |
| 2019/0181446 | A1* | 6/2019 | Hayashi .............. H01M 4/1397 |
| 2020/0127293 | A1 | 4/2020 | Son et al. |

FOREIGN PATENT DOCUMENTS

| | | | |
|---|---|---|---|
| CN | 108475774 A | | 8/2018 |
| EP | 2 270 901 A1 | | 1/2011 |
| EP | 3 509 138 A2 | | 7/2019 |
| JP | 5-298915 A | | 11/1993 |
| JP | 9-283125 A | | 10/1997 |
| JP | 11-307129 A | | 11/1999 |
| JP | 2002-237293 A | | 8/2002 |
| JP | 2004-206942 A | | 7/2004 |
| JP | 3640863 B2 | | 4/2005 |
| JP | 2010-231950 A | | 10/2010 |
| JP | 5241060 B2 | | 7/2013 |
| JP | 5588128 B2 | | 9/2014 |
| JP | 2015-69809 A | | 4/2015 |
| JP | 2016-15250 A | | 1/2016 |
| JP | 2016-91984 A | | 5/2016 |
| JP | 2017-21971 A | | 1/2017 |
| KR | 10-0125151 B1 | | 12/1997 |
| KR | 10-2001-0024927 A | | 3/2001 |
| KR | 10-0285123 B1 | | 3/2001 |
| KR | 10-2002-0085942 A | | 11/2002 |
| KR | 10-0368438 B1 | | 1/2003 |
| KR | 10-2004-0090561 A | | 10/2004 |
| KR | 10-0484713 B1 | | 4/2005 |
| KR | 10-0485336 B1 | | 4/2005 |
| KR | 10-2005-0041661 A | | 5/2005 |
| KR | 10-0508945 B1 | | 8/2005 |
| KR | 10-0542213 B1 | | 1/2006 |
| KR | 10-2006-0111393 A | | 10/2006 |
| KR | 10-0658546 B1 | | 12/2006 |
| KR | 10-2010-0098548 A | | 9/2010 |
| KR | 10-2012-0000708 A | | 1/2012 |
| KR | 10-1107731 B1 | | 1/2012 |
| KR | 10-2012-0035131 A | | 4/2012 |
| KR | 10-2012-0092918 A | | 8/2012 |
| KR | 10-2013-0042513 A | | 4/2013 |
| KR | 10-2013-0111833 A | | 10/2013 |
| KR | 10-2013-0112567 A | | 10/2013 |
| KR | 10-2013-0134949 A | | 12/2013 |
| KR | 10-1336943 B1 | | 12/2013 |
| KR | 10-2014-0006639 A | | 1/2014 |
| KR | 10-1374754 B1 | | 3/2014 |
| KR | 10-2014-0082074 A | | 7/2014 |
| KR | 10-2014-0083024 A | | 7/2014 |
| KR | 10-2014-0110373 A | | 9/2014 |
| KR | 10-2014-0112597 A | | 9/2014 |
| KR | 10-2014-0120269 A | | 10/2014 |
| KR | 10-2015-0101235 A | | 9/2015 |
| KR | 10-1551521 B1 | | 9/2015 |
| KR | 10-2015-0129534 A | | 11/2015 |
| KR | 10-2015-0143372 A | | 12/2015 |
| KR | 10-2016-0051196 A | | 5/2016 |
| KR | 10-2016-0052323 A | | 5/2016 |
| KR | 20160052351 A | * | 5/2016 |
| KR | 10-1648465 B1 | | 8/2016 |
| KR | 10-2016-0136247 A | | 11/2016 |
| KR | 10-2016-0136248 A | | 11/2016 |
| KR | 10-2016-0138120 A | | 12/2016 |
| KR | 10-2017-0003209 A | | 1/2017 |
| KR | 10-2017-0099375 A | | 8/2017 |
| KR | 10-2017-0123727 A | | 11/2017 |
| KR | 10-2018-0007798 A | | 1/2018 |
| KR | 10-2018-0010423 A | | 1/2018 |
| KR | 10-2018-0019822 A | | 2/2018 |
| KR | 10-2018-0020599 A | | 2/2018 |
| KR | 10-2018-0032168 A | | 3/2018 |
| KR | 10-2018-0036564 A | | 4/2018 |
| KR | 10-1850901 B1 | | 4/2018 |
| KR | 10-1865834 B1 | | 6/2018 |
| KR | 10-2018-0074248 A | | 7/2018 |
| KR | 10-2018-0076709 A | | 7/2018 |
| KR | 10-2018-0092180 A | | 8/2018 |
| WO | WO 01/97304 A1 | | 12/2001 |
| WO | WO 2013/137224 A1 | | 9/2013 |
| WO | WO 2017/104867 A1 | | 6/2017 |
| WO | WO-2017169599 A1 * | 10/2017 | ........ H01M 10/0562 |
| WO | WO 2018/191025 A1 | | 10/2018 |

OTHER PUBLICATIONS

Ohta et al., "LiNbO$_3$-coated LiCoO$_2$ as cathode material for all solid-state lithium secondary batteries", Electrochemistry Communications, vol. 9, 2007, pp. 1486-1490.

Qian et al., "Anode-Free Rechargeable Lithium Metal Batteries", Advanced Functional Materials, vol. 26, 2016, pp. 7094-7102.

Qian et al., "High rate and stable cycling of lithium metal anode", Nature communications, vol. 6, 2015, pp. 1-9.

Tominaga et al., "Fast Li-ion conduction in poly(ethylene carbonate)-based electrolytes and composites filled with TiO$_2$ nanoparticles", Chem. Commun., vol. 50, 2014, pp. 4448-4450.

(56) References Cited

OTHER PUBLICATIONS

Yan et al., "Ultrathin Two-Dimensional Atomic Crystals as Stable Interfacial Layer for Improvement of Lithium Metal Anode", Nano Letters, vol. 14, 2014, pp. 6016-6022.
Zhang et al., "Lithium bis(fluorosulfonyl)imide/poly(ethylene oxide) polymer electrolyte", Electrochimica Acta, vol. 133, 2014, pp. 529-538.
European Patent Office Search Report dated Apr. 22, 2021 in family application No. EP19880365.2.
European Communication pursuant to Article 94(3) EPC for European Application No. 19880365.2, dated Nov. 22, 2023.

\* cited by examiner

[Figure 1]
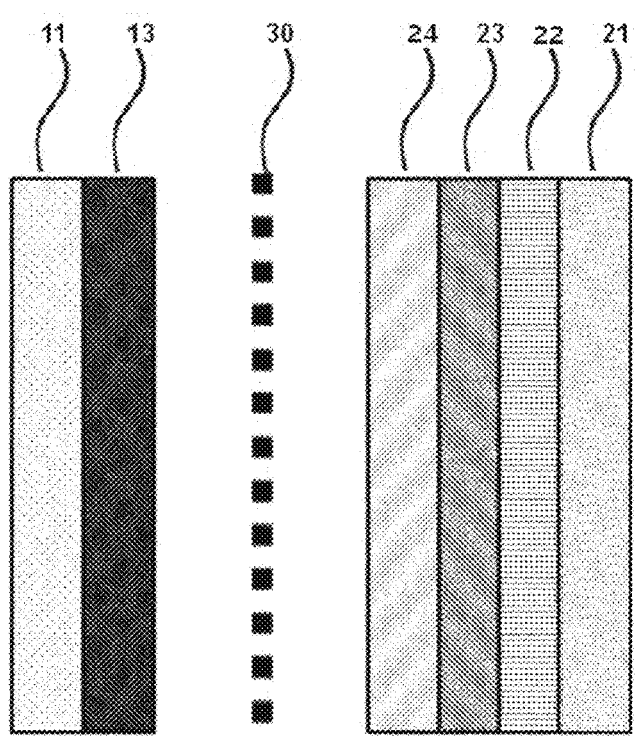

[Figure 2]
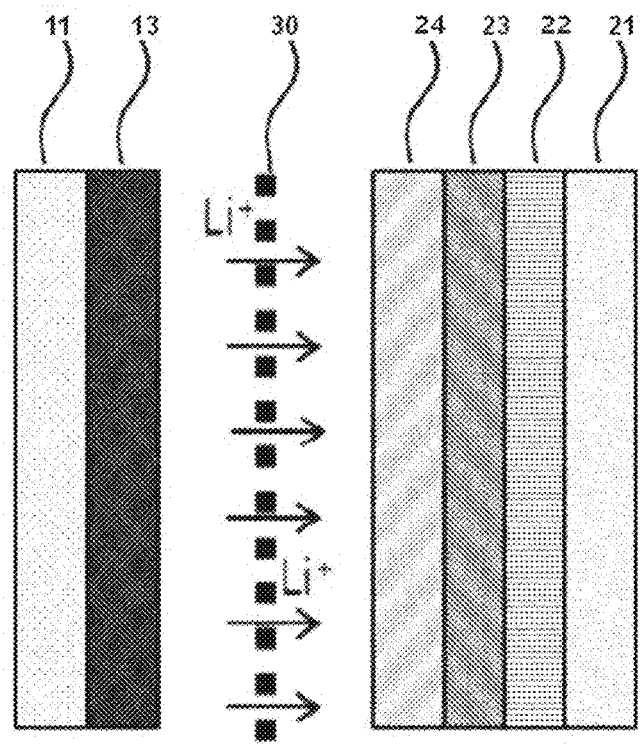
[Figure 3]
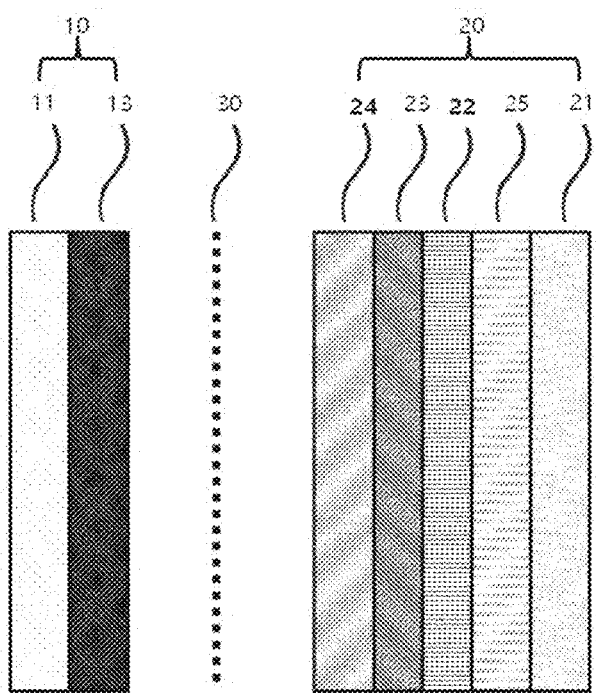

[Figure 4]
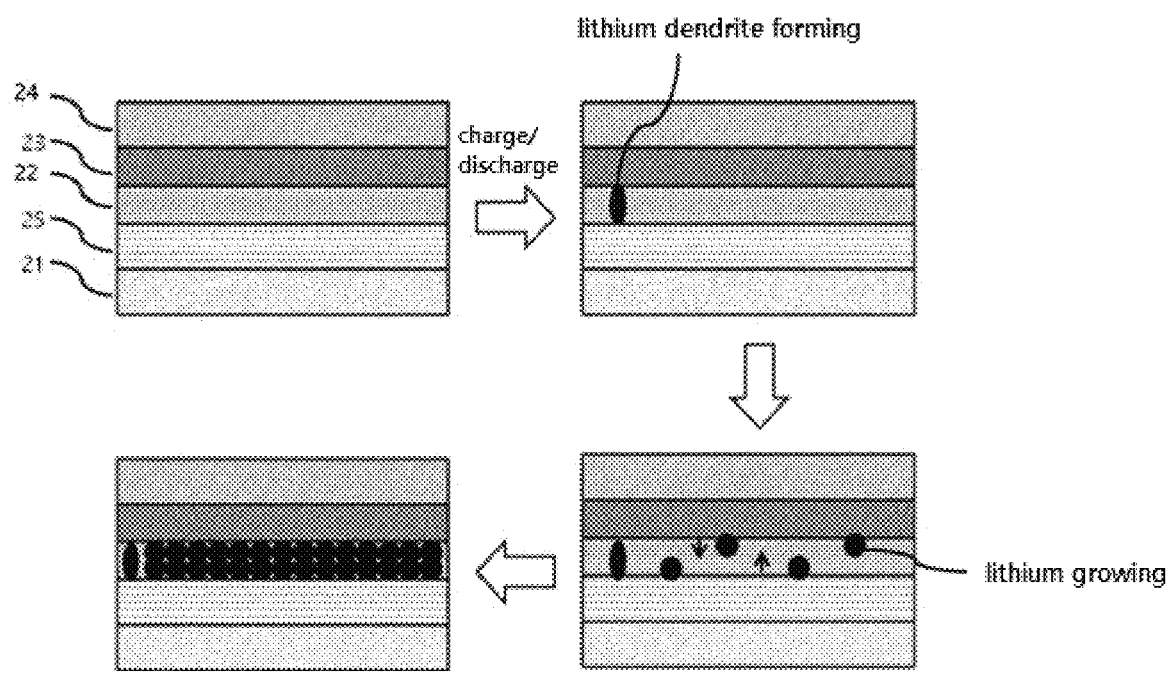

LITHIUM SECONDARY BATTERY

TECHNICAL FIELD

This application claims the benefit of priorities based on Korean Patent Application No. 10-2018-0131662 filed on Oct. 31, 2018, and Korean Patent Application No. 10-2019-0137138 filed on Oct. 31, 2019, the entire disclosure of which are incorporated herein by reference its entirety.

The present invention relates to a negative electrode free-structured lithium secondary battery comprising a negative electrode protective layer.

BACKGROUND ART

Various battery-requiring devices from portable phones, wireless home appliances to electric vehicles have been recently developed, and with the development of such devices, demands for secondary batteries have also increased. Particularly, with the trend of smaller electronic goods, secondary batteries tend to be lighter and smaller as well.

Corresponding to such a trend, lithium secondary batteries using lithium metal as an active material have recently received attention. Lithium metal has a property of low oxidation-reduction potential (−3.045 V with respect to standard hydrogen electrode) and large weight energy density (3,860 mAhg$^{-1}$), and has been expected as a negative electrode material of high capacity secondary batteries.

However, when using lithium metal as a battery negative electrode, the battery is generally manufactured by attaching lithium foil on a flat current collector, and since lithium explosively reacts with water and also reacts with oxygen in the atmosphere with its high reactivity as an alkali metal, there is a disadvantage in that manufacture and use are difficult under general environments. Particularly, an oxide layer such as LiOH, Li$_2$O and Li$_2$CO$_3$ is obtained as a result of oxidation when lithium metal is exposed to the atmosphere. When a surface oxide layer (native layer) is present on the surface, the oxide layer functions as an insulator film decreasing electrical conductivity, and causes a problem of increasing electric resistance by inhibiting smooth lithium ion migration.

For such a reason, the problem of forming a surface oxide layer caused by lithium metal reactivity has been partly improved by performing a vacuum deposition process in forming a lithium negative electrode, however, fundamental suppression of surface oxide layer formation is still impossible by the exposure to the atmosphere during a battery assembly process. In view of the above, development of a lithium metal electrode capable of resolving a lithium reactivity problem and more simplifying a process while increasing energy efficiency by using lithium metal has been required.

PRIOR ART DOCUMENTS

Patent Documents

Korean Patent Publication No. 10-2016-0052323 "Lithium Electrode and Lithium Battery Comprising the Same"

DISCLOSURE

Technical Problem

As a result of extensive studies in view of the above, the inventors of the present invention have designed a negative electrode free battery structure capable of forming a lithium metal layer on a negative electrode current collector using lithium ions transferred from a positive electrode active material through charge after assembling the battery so as to fundamentally block a contact of the lithium metal with the atmosphere when assembling the battery, and have developed a composition of a positive electrode active material capable of stably forming the lithium metal layer. In addition, the inventors of the present invention have developed a lithium secondary battery capable of, by consecutively forming first to third protective layers on a negative electrode current collector, preventing a decrease in the battery lifetime caused by lithium dendrite generated during battery charge and discharge.

Accordingly, it is an object of the present invention provide a lithium secondary battery having enhanced performance and lifetime by resolving problems caused by lithium metal reactivity, and problems occurring during an assembly process.

Technical Solution

In order to achieve the above object, the present invention provides a lithium secondary battery comprising a positive electrode, a negative electrode, a lithium metal layer and an electrolyte disposed between the positive electrode and the negative electrode,
  wherein the negative electrode comprises a first protective layer formed on a negative electrode current collector, a second protective layer formed on the first protective layer opposite the negative electrode current collector, and a third protective layer formed inside and on one surface of the second protective layer opposite the first protective layer, and
  wherein the lithium metal layer is formed between the negative electrode current collector and the first protective layer in the negative electrode when lithium ions migrate from the positive electrode after charging.

Advantageous Effects

A lithium secondary battery according to the present invention is coated while being blocked from the atmosphere through a process of forming a lithium metal layer on a negative electrode current collector, and therefore, is capable of suppressing formation of a surface oxide layer on the lithium metal caused by oxygen and moisture in the atmosphere, and as a result, an effect of enhancing cycle lifetime properties is obtained.

In addition, by including first to third protective layers on a negative electrode current collector, a decrease in the battery lifetime caused by lithium dendrite can be prevented.

DESCRIPTION OF DRAWINGS

FIG. 1 is a mimetic diagram of a lithium secondary battery manufactured in the present invention.

FIG. 2 is a mimetic diagram illustrating lithium ion (Li$^+$) migration when initially charging the lithium secondary battery manufactured in the present invention.

FIG. 3 is a mimetic diagram after completing initial charge on the lithium secondary battery manufactured in the present invention.

FIG. 4 is a flow diagram illustrating changes in a negative electrode obtained by charging and discharging the lithium secondary battery manufactured in the present invention.

BEST MODE

Hereinafter, the present invention will be described in detail with reference to accompanying drawings so that those skilled in the art readily implement the present invention. However, the present invention may be embodied in various different forms, and is not limited to the present specification.

In the drawings, parts not relevant to the descriptions are not included in order to clearly describe the present invention, and like reference numerals are used for like elements throughout the specification. In addition, sizes and relative sizes of constituents presented in the drawings are unrelated to actual scales, and may be reduced or exaggerated for clarity of the descriptions.

The present invention relates to a lithium secondary battery comprising a positive electrode, a negative electrode and an electrolyte, wherein the negative electrode comprises a first protective layer formed on a negative electrode current collector, a second protective layer formed on the first protective layer, and a third protective layer formed inside and on one surface of the second protective layer, and lithium ions migrate from the positive electrode by charge to form lithium metal between the negative electrode current collector and the first protective layer in the negative electrode.

FIG. 1 is a sectional diagram of a lithium secondary battery manufactured according to the present invention, and is provided with a positive electrode including a positive electrode current collector 11 and a positive electrode mixture 13; a negative electrode including a negative electrode current collector 21 and first to third protective layers 22, 23, 24; and a separator 30 and an electrolyte (not shown) provided therebetween.

In a common negative electrode of a lithium secondary battery, a negative electrode is formed on a negative electrode current collector 21, however, in the present invention, only a negative electrode current collector 21 and first to third protective layers 22, 23, 24 are used to assemble a negative electrode free battery structure, and then, lithium ions deintercalated from a positive electrode mixture 13 by charge form a lithium metal layer (not shown) between the negative electrode current collector 21 and the first protective layer 22 as a negative electrode mixture, and as a result, a negative electrode having a known constitution of a negative electrode current collector/negative electrode mixture is formed to obtain a constitution of a common lithium secondary battery.

In other words, in the present invention, a negative electrode free battery is a concept including both a battery that is negative electrode free in which a negative electrode is not formed on a negative electrode current collector when initially assembling the battery, or a battery that may have a negative electrode by having a negative electrode formed on a negative electrode current collector according to use.

In addition, in the negative electrode of the present invention, a form of lithium metal formed as a negative electrode mixture on a negative electrode current collector includes both a form in which lithium metal is formed in a layer, and a porous structure in which lithium metal is not formed in a layer (for example, a structure in which lithium metal aggregates in a particle form).

Hereinafter, the present invention will be described based on a lithium metal layer 25 form in which lithium metal is formed in a layer, however, it is clear that such a description does not exclude a structure in which lithium metal is not formed in a layer.

FIG. 2 is a mimetic diagram illustrating lithium ion ($Li^+$) migration when initially charging the lithium secondary battery manufactured according to the present invention, and FIG. 3 is a mimetic diagram after completing initial charge on the lithium secondary battery manufactured according to the present invention.

According to FIG. 2 and FIG. 3, when a lithium secondary battery having a negative electrode free battery structure is charged by applying a voltage of a certain level or higher, lithium ions are released from a positive electrode mixture 13 in a positive electrode 10, and migrate toward a negative electrode current collector 21 side after passing through a separator 30 and first to third protective layers 22, 23, 24, and form a lithium metal layer 25 formed purely with lithium on the negative electrode current collector 21, more specifically, between the negative electrode current collector and the first protective layer 22 to form a negative electrode 20.

Such lithium metal layer 25 formation through charge has advantages of forming a thin film layer and very readily adjusting interfacial properties when compared to an existing negative electrode obtained by sputtering a lithium metal layer 25 on a negative electrode current collector 21 or laminating lithium foil and a negative electrode current collector 21. In addition, since bonding strength of the lithium metal layer 25 laminated on the negative electrode current collector 21 is large and stable, a problem of being removed from the negative electrode current collector 21 caused by an ionized state through discharge does not occur.

Particularly, lithium metal is not exposed to the atmosphere at all during a battery assembling process by being formed to a negative electrode free battery structure, which fundamentally blocks existing problems such as formation of an oxide layer on the surface caused by high reactivity of the lithium itself and a decrease in the lifetime of a lithium secondary battery resulting therefrom.

In the negative electrode free battery structure of the present invention, the negative electrode current collector forming the negative electrode is generally made to a thickness of 3 μm to 50 μm.

The negative electrode current collector 21 capable of forming a lithium metal layer 25 through charge is not particularly limited as long as it has conductivity without inducing chemical changes to a lithium secondary battery. As an example, copper, stainless steel, aluminum, nickel, titanium, baked carbon, copper or stainless steel of which surface is treated with carbon, nickel, titanium, silver and the like, aluminum-cadmium alloys and the like may be used.

Herein, the negative electrode current collector 21 may be used in various forms such as films, sheets, foil, nets, porous bodies, foams and non-woven fabrics having micro-unevenness formed on the surface.

In the negative electrode of the lithium secondary battery according to the present invention, first to third protective layers are consecutively formed on a negative electrode current collector. Specifically, a first protective layer is formed on a negative electrode current collector, a second protective layer is formed on the first protective layer, and a third protective layer is formed inside and on one surface of the second protective layer.

The first protective layer is formed on a negative electrode current collector, and, after forming lithium metal between the negative electrode current collector and the first protective layer by charge, performs a role of preventing lithium ion depletion from the lithium metal surface and minimizing volume changes in the lithium metal during charge and discharge, and in order to perform the above-described roles, may be formed with an elastomer having high ion conductivity.

The first protective layer may include one or more types selected from the group consisting of a poly(vinylidene fluoride-co-hexafluoropropylene) (PVdF-HFP) polymer, a polyurethane-based polymer, a polyacryl-based polymer, a polyethylene polymer, a polyether-based polymer, a poly siloxane-based polymer, a polyethylene derivative, a polyethylene oxide derivative, a polypropylene oxide derivative, a phosphoric acid ester polymer, polyagitation lysine, polyester sulfide, polyvinyl alcohol, polyvinylidene fluoride and a polymer including an ionic dissociation group, and may preferably include PVdF-HFP.

In the PVdF-HFP, the HFP content may be 5% by weight or greater, the polyurethane-based polymer may have shore hardness of 80 A or less, and the polyacryl-based polymer may have crosslinking density of $10^{-4}$ mol/g or less. When the shore hardness is too low, the amount of electrolyte impregnation is too much increasing a battery volume, and when the crosslinking density is too high, ion conductivity decreases increasing resistance.

The first protective layer may have ion conductivity of $10^{-5}$ S/cm to $10^{-2}$ S/cm, and preferably $10^{-4}$ S/cm to $10^{-3}$ S/cm. The ion conductivity being less than $10^{-5}$ S/cm may cause lithium ion depletion on the lithium metal surface declining battery performance, and when the ion conductivity is greater than $10^{-2}$ S/cm, battery performance is not further enhanced even with an increase in the ion conductivity.

The first protective layer thickness is sufficient as long as the first protective layer is coated to have mechanical properties capable of minimizing volume changes in the lithium metal during charge and discharge, and when the thickness is too large, an unnecessary increase in the electrode thickness is induced, and therefore, the first protective layer may have a thickness of 200 nm to 10 μm.

When the first protective layer is not formed, the second protective layer and lithium metal are directly connected resulting in electrical connection therebetween. Accordingly, the lithium metal grows in the third protective layer and separator direction from the second protective layer.

In addition, the first protective layer may further include a lithium salt. The lithium salt may be one or more types selected from the group consisting of $LiNO_3$, LiFSI, $LiPF_6$, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiPF_6$, $LiAlCl_4$, $CH_3SO_3Li$, $CF_3SO_3Li$, $(CF_3SO_2)_2NLi$, chloroborane lithium and lithium tetraphenylborate.

The second protective layer is formed on the first protective layer, and performs a role of, when lithium dendrite grows to be in contact with the first protective layer, allowing lithium metal to grow in both directions by preventing electrons of the second protective layer and the lithium metal concentrated through electrically connecting the lithium dendrite and the second protective layer.

For this, the second protective layer may have a three-dimensional structure shape having inner space formed, and the inner space may be referred to as a pore. In other words, the second protective layer may be an electrically conductive matrix having a pore formed therein.

The third protective layer is formed in an inner pore and on a surface of the second protective layer, and since electrons ($e^-$) of the second protective layer having excellent electric conductivity is evenly transferred to the whole area and the first protective layer has higher ion conductivity than the third protective layer included in the inner pore of the second protective layer, reduction occurs in the lithium ion ($Li^+$) abundant first protective layer and lithium dendrite is formed inside the first protective layer only, and the lithium dendrite is prevented from growing outside the lithium electrode.

In addition, the electrically conductive matrix included in the second protective layer and the ion conducting polymer included in the third protective layer may have a volume ratio of 95:5 to 50:50, and more preferably 80:20 to 60:40. When the volume ratio of the ion conducting polymer of the third protective layer with respect to the electrically conductive matrix of the second protective layer is less than the above-mentioned range, Li ion conductivity of the protective layer is very low declining battery performance by functioning as high resistance, and when the volume ratio is greater than the above-mentioned range, vertical/horizontal electric conductivity decreases making uniform electron transfer to the electrode surface difficult.

In addition, the second protective layer has sheet resistance of $5 \times 10^{-2}$ Ω/sq. to 1000 Ω/sq., preferably $10^{-2}$ Ω/sq. to 500 Ω/sq., and more preferably $10^{-2}$ Ω/sq. to 300 Ω/sq. As the sheet resistance is higher, electric conductivity is lower resulting in a poor electric life. The sheet resistance of less than $5 \times 10^{-2}$ Ω/sq. means very high electric conductivity, and considering that a film formed with a silver paste has a value of $3 \times 10^{-2}$ Ω/sq., the value may be difficult to actually obtain. In addition, when the sheet resistance is greater than 1000 Ω/sq., battery lifetime properties may decline by functioning as a high resistive layer.

In the present invention, the second protective layer may have vertical lithium ion conductivity of $1 \times 10^{-6}$ S/cm to $1 \times 10^{-3}$ S/cm, preferably $1 \times 10^{-5}$ S/cm to $1 \times 10^{-3}$ S/cm, and more preferably $1 \times 10^{-4}$ S/cm to $1 \times 10^{-3}$ S/cm at room temperature. When the vertical lithium ion conductivity is less than the above-mentioned range, vertical ion conductivity is poor, and battery performance declines by functioning as high resistance, and when the vertical lithium ion conductivity is greater than the above-mentioned range, lithium dendrite may grow through the second and the third protective layers causing a problem in battery stability.

In the present invention, the electrically conductive matrix may include an electrically conductive material, and may further include a binder. When the electrically conductive matrix includes both an electrically conductive material and a binder, the electrically conductive matrix may specifically include the electrically conductive material in 70% by weight to 90% by weight and the binder in 10% by weight to 30% by weight.

The electrically conductive material is uniformly distributed over the whole electrically conductive matrix so that the protective layer exhibits uniform electric conductivity.

The type of the electrically conductive material included in the electrically conductive matrix is a type forming a skeleton forming the electrically conductive matrix, a type forming a matrix by mixing the electrically conductive material and the binder, a type coating the electrically conductive material on the matrix skeleton, a type of a spun electrically conductive material, or a mixture type of an electrically conductive polymer and an ion conducting polymer.

The electrically conductive material may be one or more types selected from the group consisting of an electrically conductive metal, a semiconductor and an electrically conductive polymer. The electrically conductive metal may be one or more types selected from the group consisting of gold, silver, aluminum, copper, nickel, zinc, carbon, tin and indium. The semiconductor may be one or more types selected from the group consisting of silicon and germanium. The electrically conductive polymer may be one or more types selected from the group consisting of poly(3,4-ethylenedioxythiophene) (PEDOT), polyaniline, polypyrrole, polythiophene, polyacetylene, polyphenylene and polythienylene vinylene.

The electrically conductive material may be included in the electrically conductive matrix in 70% by volume to 90% by volume, preferably in 75% by volume to 90% by volume, and more preferably in 75% by volume to 85% by volume. When the content is less than the above-mentioned range, electric conductivity of the protective layer may decrease, and when the content is greater than the above-mentioned range, the binder content relatively decreases, which may reduce durability of the protective layer.

The binder may be one or more types selected from the group consisting of polyvinylidene fluoride (PVDF), polyvinylidene fluoride-co-hexafluoropropylene, polyvinylidene fluoride-co-trichloroethylene, polybutyl acrylate, polymethyl methacrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, styrene-butadiene rubber, an acrylonitrile-styrene-butadiene copolymer and polyimide, and may preferably be polyvinylidene fluoride (PVDF).

The binder may be included in the electrically conductive matrix in 0% by weight to 40% by weight, preferably in 0% by weight to 20% by weight, and more preferably in 0% by weight to 10% by weight. When the content is less than the above-mentioned range, electric conductivity of the protective layer may decrease, and when the content is greater than the above-mentioned range, the binder content relatively decreases, which may reduce durability of the protective layer.

The second protective layer thickness is sufficient as long as the second protective layer is coated to have mechanical properties capable of physically suppressing lithium dendrite growth, and when the thickness is too large, an unnecessary increase in the electrode thickness is induced, and therefore, the second protective layer may have a thickness of 1 μm to 10 μm.

The third protective layer is formed inside and on the surface of the second protective layer, and may perform a role of physically suppressing lithium dendrite growth. Specifically, when the third protective layer is formed inside the second protective layer, the third protective layer may be formed on an inner pore of the second protective layer.

Accordingly, the third protective layer may be formed with a material having excellent strength and low ion conductivity, and the third protective layer may include an ion conducting polymer.

The ion conducting polymer may be one or more types selected from the group consisting of polyvinylidene fluoride, polyethylene oxide, polyethylene glycol, polypropylene glycol, polypropylene oxide, polyethylene succinate, polyethylene adipate, polyethyleneimine, polyepichlorohydrin, polyp-propiolactone, polyN-propylaziridine, polyethylene glycol diacrylate, polypropylene glycol diacrylate, polyethylene glycol dimethacrylate and polypropylene glycol dimethacrylate.

In addition, the second protective layer and the third protective layer may be included in a weight ratio of 3:7 to 7:3. When the electrically conductive matrix of the second protective layer is included in greater than a proper weight outside the weight range defined as above, the content of the ion conducting polymer of the third protective layer relatively decreases, and suppressing lithium dendrite growth is difficult since more lithium grows on the third protective layer due to very low lithium ion conductivity of the third protective layer. On the other hand, when the electrically conductive matrix of the second protective layer is included in less than a proper weight outside the weight range defined as above, vertical/horizontal electric conductivity decreases making uniform electron transfer to the electrode surface difficult.

The ion conducting polymer may further include a crosslinking monomer, and the crosslinking monomer type is not particularly limited. For example, any one of ethylene glycol di(meth)acrylate, poly(ethylene glycol) di(meth)acrylate, 1,6-hexanediol di(meth)acrylate, tri(propylene glycol) di(meth)acrylate, tris(2-(meth)acryloethyl) isocyanurate, trimethylolpropane tri(meth)acrylate, pentaerythritol di(meth)acrylate, pentaerythritol tri(meth)acrylate, pentaerythritol tetra(meth)acrylate, dipentaerythritol di(meth)acrylate, dipentaerythritol tri(meth)acrylate, dipentaerythritol tetra(meth)acrylate, dipentaerythritol penta(meth)acrylate, dipentaerythritol hexa(meth)acrylate, acrylic acid, isobornyl acrylate, acrylonitrile, ethylene glycol (meth)acrylate, ethylhexyl (meth)acrylate, methyl (meth)acrylate, trimethylpropane triacrylate (TMPTA) and trimethylpropane ethoxylate triacrylate (ETPTA) may be used.

In addition, the electrolyte of the lithium secondary battery of the present invention may include a non-aqueous solvent and a lithium salt.

The lithium salt may be one or more types selected from the group consisting of LiFSI, $LiPF_6$, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiPF_6$, $LiAlCl_4$, $CH_3SO_3Li$, $CF_3SO_3Li$, $(CF_3SO_2)_2NLi$, chloroborane lithium and lithium tetraphenylborate.

In addition, as the non-aqueous solvent, those commonly used in an electrolyte for a lithium secondary battery may be used without limit, and for example, ether, ester, amide, linear carbonate, cyclic carbonate and the like may be used either alone, or as a mixture of two or more types thereof. Among these, cyclic carbonate, linear carbonate, or a carbonate compound that is slurry thereof may be typically included.

Specific examples of the cyclic carbonate compound may include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate and halides thereof, or slurry of two or more types thereof. Examples of the halides thereof may include fluoroethylene carbonate (FEC) and the like, but are not limited thereto.

Specific examples of the linear carbonate compound may typically include any one selected from the group consisting of dimethyl carbonate (DMC), diethyl carbonate (DEC), dipropyl carbonate, ethylmethyl carbonate (EMC), methylpropyl carbonate and ethylpropyl carbonate, or slurry of two or more types thereof, but are not limited thereto. Particularly, among the carbonate-based organic solvents, ethylene carbonate and propylene carbonate that are cyclic carbonate have a high dielectric constant as a highly viscous organic solvent, and therefore, may more favorably dissociate a lithium salt in an electrolyte, and when mixing and using linear carbonate having low viscosity and low dielectric constant such as dimethyl carbonate and diethyl carbonate in a proper ratio to such cyclic carbonate, an electrolyte having higher ion conductivity may be prepared.

In addition, as the ether among the non-aqueous solvents, any one selected from the group consisting of dimethyl ether, diethyl ether, dipropyl ether, methylethyl ether, methylpropyl ether and ethylpropyl ether, or slurry of two or more types thereof may be used, however, the ether is not limited thereto.

As the ester among the non-aqueous solvents, any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or slurry of two or more types thereof may be used, however, the ester is not limited thereto.

FIG. 4 is a mimetic diagram presenting a principle of preventing lithium dendrite growth in a lithium metal layer 25-formed negative electrode by charging the lithium secondary battery.

When referring to FIG. 4, lithium dendrite grows in a lithium metal layer 25 as charge and discharge of the lithium secondary battery progress, and as a result, the lithium metal layer 25 and the second protective layer 23 are brought into contact with each other electrically. After that, electrons of the second protective layer 23 having excellent electric conductivity are uniformly transferred to the whole area, and since the first protective layer 22 has higher ion conductivity than the third protective layer 24 included inside the second protective layer, reduction occurs in the lithium ion (Li$^+$) abundant first protective layer 22 and lithium dendrite is formed inside the first protective layer 22 only, and the lithium dendrite is prevented from growing outside the lithium electrode.

Accordingly, by including the first to third protective layers on the negative electrode current collector and each of the protective layers performing its role, a lithium secondary battery having excellent lifetime properties may be provided.

Meanwhile, the positive electrode mixture 13, various positive electrode active materials may be used depending on the battery type, and the positive electrode active material used in the present invention is not particularly limited as long as it is a material capable of intercalating or deintercalating lithium ions, however, a lithium transition metal oxide is typically used currently as a positive electrode active material capable of obtaining a battery having excellent lifetime properties and charge and discharge efficiency.

As the lithium transition metal oxide, layer compounds such as lithium cobalt oxide (LiCoO$_2$) or lithium nickel oxide (LiNiO$_2$) including two or more transition metals, and for example, substituted with one or more transition metals; lithium manganese oxide substituted with one or more transition metals, lithium nickel-based oxides, spinel-based lithium nickel manganese composite oxides, spinel-based lithium manganese oxides in which some of Li of the chemical formula are substituted with alkaline-earth metals, olivine-based lithium metal phosphates, and the like may be included, however, the lithium transition metal oxide is not limited thereto.

A lithium-containing transition metal oxide is preferably used, and for example, one or more types selected from the group consisting of LiCoO$_2$, LiNiO$_2$, LiMnO$_2$, LiMn$_2$O$_4$, Li$_2$NiO$_2$, Li(Ni$_a$Co$_b$Mn$_c$)O$_2$ (0<a<1, 0<b<1, 0<c<1, and a+b+c=1), LiNi$_{1-Y}$Co$_Y$O$_2$, LiCo$_{1-Y}$Mn$_Y$O$_2$, LiNi$_{1-Y}$Mn$_Y$O$_2$ (herein, 0≤Y<1), Li(Ni$_a$Co$_b$Mn$_c$)O$_4$ (0<a<2, 0<b<2, 0<c<2, and a+b+c=2), LiMn$_{2-z}$Ni$_z$O$_4$, LiMn$_{2-z}$Co$_z$O$_4$ (herein, 0<Z<2), Li$_x$M$_y$Mn$_{2-y}$O$_{4-z}$A$_z$ (herein, 0.9≤x≤1.2, 0<y<2, 0≤z<0.2, M=one or more of Al, Mg, Ni, Co, Fe, Cr, V, Ti, Cu, B, Ca, Zn, Zr, Nb, Mo, Sr, Sb, W, Ti and Bi, and A is one or more anions of −1 or −2 valency), Li$_{1+a}$Ni$_b$M'$_{1-b}$O$_{2-c}$A'$_c$ (herein, 0≤a≤0.1, 0≤b≤0.8, 0≤c<0.2, M' is one or more types selected from the group consisting of octahedral stable elements such as Mn, Co, Mg or Al, and A' is one or more anions of −1 or −2 valency), LiCoPO$_4$ and LiFePO$_4$ may be used, and preferably, LiCoO$_2$ is used. In addition to such oxides, sulfides, selenides, halides and the like may also be used.

The lithium transition metal oxide is used in the positive electrode mixture 13 as a positive electrode active material together with a binder, a conductor and the like. In the negative electrode free battery structure of the present invention, a lithium source for forming the lithium metal layer 25 becomes the lithium transition metal oxide. In other words, when conducting charging in a specific voltage range, lithium ions in the lithium transition metal oxide are released forming the lithium metal layer 25 on the negative electrode current collector 21.

However, since lithium ions in the lithium transition metal oxide are not readily released by itself or there is no lithium to involve other than charge and discharge at the above-mentioned operating voltage level, the lithium metal layer 25 is very difficult to form, and when using only a lithium transition metal oxide, irreversible capacity greatly decreases causing a problem of declining capacity and lifetime properties of a lithium secondary battery.

In view of the above, a lithium metal compound that is a highly irreversible material having initial charge capacity of 200 mAh/g or initial irreversibility of 30% or greater when conducting one-time charge at 0.01 C to 0.2 C in a voltage range of 4.5 V to 2.5 V is used together as an additive capable of providing a lithium source to the lithium transition metal oxide in the present invention.

The term 'highly irreversible material' mentioned in the present invention may be used in the same manner as 'large capacity irreversible material' in another term, and this means a material having a high irreversible capacity ratio of a first charge and discharge cycle, that is, high "(first cycle charge capacity-first cycle discharge capacity)/first cycle charge capacity". In other words, a highly irreversible material may irreversibly provide an excess amount of lithium ions during a first charge and discharge cycle. For example, among lithium transition metal compounds capable of intercalating and deintercalating lithium ions, a positive electrode material having large irreversible capacity of a first charge and discharge cycle (first cycle charge capacity-first cycle discharge capacity) may be considered.

Irreversible capacity of a generally used positive electrode active material is approximately from 2% to 10% with respect to initial charge capacity, but in the present invention, a lithium metal compound that is a highly irreversible material, that is, a lithium metal compound having initial irreversibility of 30% or greater and preferably 50% or greater of the initial charge capacity may be used together. In addition, as the lithium metal compound, materials having initial charge capacity of 200 mAh/g or greater, and preferably 230 mAh/g or greater may be used. Using such a lithium metal compound performs a role of a lithium source capable of forming the lithium metal layer 25 while increasing irreversible capacity of the lithium transition metal oxide that is the positive electrode active material.

As the lithium metal compound provided in the present invention, compounds represented by the following Chemical Formula 1 to Chemical Formula 8 may be used.

$$Li_2Ni_{1-a}M^1{}_aO_2 \quad \text{[Chemical Formula 1]}$$

(in the formula, a is 0≤a<1, and $M^1$ is an element of one or more types selected from the group consisting of Mn, Fe, Co, Cu, Zn, Mg and Cd), $$Li_{2+b}Ni_{1-c}M^2{}_cO_{2+d} \quad \text{[Chemical Formula 2]}$$

(in the formula, −0.5≤b≤0.5, 0≤c≤1, 0≤d<0.3, and $M^2$ is an element of one or more types selected from the group consisting of P, B, C, Al, Sc, Sr, Ti, V, Zr, Mn, Fe, Co, Cu, Zn, Cr, Mg, Nb, Mo and Cd), $$LiM^3{}_eMn_{1-e}O_2 \quad \text{[Chemical Formula 3]}$$

(in the formula, 0≤e<0.5, and $M^3$ is an element of one or more types selected from the group consisting of Cr, Al, Ni, Mn and Co), $$Li_2M^4O_2 \quad \text{[Chemical Formula 4]}$$

(in the formula, $M^4$ is an element of one or more types selected from the group consisting of Cu and Ni), $$Li_{3+f}Nb_{1-g}M^5{}_gS_{4-h} \quad \text{[Chemical Formula 5]}$$

(in the formula, −0.1≤f≤1, 0≤g≤0.5, −0.1≤h≤0.5, and $M^5$ is an element of one or more types selected from the group consisting of Mn, Fe, Co, Cu, Zn, Mg and Cd), $$LiM^6{}_iMn_{1-i}O_2 \quad \text{[Chemical Formula 6]}$$

(in the formula, i is 0.05≤i<0.5, and $M^6$ is an element of one or more types selected from the group consisting of Cr, Al, Ni, Mn and Co), $$LiM^7{}_{2j}Mn_{2-2j}O_4 \quad \text{[Chemical Formula 7]}$$

(in the formula, j is 0.05≤j<0.5, and $M^7$ is an element of one or more types selected from the group consisting of Cr, Al, Ni, Mn and Co), and $$Li_k\text{-}M^8{}_m\text{-}N_n \quad \text{[Chemical Formula 8]}$$

(in the formula, $M^8$ represents an alkaline-earth metal, k/(k+m+n) is from 0.10 to 0.40, m/(k+m+n) is from 0.20 to 0.50, and n/(k+m+n) is from 0.20 to 0.50).

The lithium metal compounds of Chemical Formula 1 to Chemical Formula 8 have differences in the irreversible capacity depending on the structure. These may be used either alone or as a mixture, and perform a role of increasing irreversible capacity of the positive electrode active material.

As one example, the highly irreversible materials represented by Chemical Formula 1 and Chemical Formula 3 have different irreversible capacity depending on the type, and as one example, have values as listed in the following Table 1.

TABLE 1

| | Initial Charge Capacity (mAh/g) | Initial Discharge Capacity (mAh/g) | Initial Coulombic Efficiency | Initial Irreversible Capacity Ratio |
|---|---|---|---|---|
| [Chemical Formula 1] $Li_2NiO_2$ | 370 | 110 | 29.7% | 70.3% |
| [Chemical Formula 3] $LiMnO_2$ | 230 | 100 | 43.5% | 56.5% |
| [Chemical Formula 3] $LiCr_eMni_{1-e}O_2$ | 230 | 80 | 34.8% | 65.2% |

In addition, the lithium metal compound of Chemical Formula 2 preferably belongs to the space group Immm, and in the group, Ni and M composite oxide forming a planar quadrangle (Ni, M)O₄ with the planar quadrangle structure forming a primary chain while sharing a facing side (side formed with O—O) is more preferred. The compound of Chemical Formula 2 preferably has a crystal lattice constant of a=3.7±0.5 Å, b=2.8±0.5 Å, c=9.2±0.5 Å, α=90°, β=90° and γ=90°.

In addition, in the lithium metal compound of Chemical Formula 8, the content of the alkaline-earth metal is from 30 atomic % to 45 atomic %, and the content of the nitrogen is from 30 atomic % to 45 atomic %. Herein, when the alkaline-earth metal content and the nitrogen content are in the above-mentioned ranges, the compound of Chemical Formula 8 has excellent thermal properties and lithium ion conducting properties. In Chemical Formula 8, k/(k+m+n) is from 0.15 to 0.35 and, for example, from 0.2 to 0.33, m/(k+m+n) is from 0.30 to 0.45 and, for example, from 0.31 to 0.33, and n/(k+m+n) is from 0.30 to 0.45 and, for example, from 0.31 to 0.33.

In the electrode active material of Chemical Formula 1, a is from 0.5 to 1, b is 1, and c is 1 according to one embodiment.

A surface of the positive electrode active material may have a core-shell structure coated with any one of the compounds of Chemical Formula 1 to Chemical Formula 8.

When forming a coating layer formed with any one of the compounds of Chemical Formula 1 to Chemical Formula 8 on the core active material surface, the electrode active material exhibits stable properties while maintaining low resistance properties even under an environment of lithium ions being continuously inserted and released.

In the electrode active material according to an embodiment of the present invention, the coating layer has a thickness of 1 nm to 100 nm. When the thickness of the coating layer is in the above-mentioned range, ion conducting properties of the electrode active material are superior.

The electrode active material has an average particle diameter of 1 μm to 30 μm, and according to one embodiment, 8 μm to 12 μm. When the average particle diameter of the positive electrode active material is in the above-mentioned range, battery capacity properties are superior.

Examples of the alkaline-earth metal-doped core active material may include magnesium-doped $LiCoO_2$. The magnesium content is from 0.01 parts by weight to 3 parts by weight based on 100 parts by weight of the core active material.

The lithium transition metal oxide is used in the positive electrode mixture 13 as a positive electrode active material together with a binder, a conductor and the like. In the structure of the negative electrode free battery of the present invention, a lithium source for forming the lithium metal layer 25 becomes the lithium transition metal oxide. In other words, lithium ions in the lithium transition metal oxide are released when conducting charge in a specific voltage range to form the lithium metal layer 25 on the negative electrode current collector 21.

In the present invention, as for the charging range for forming the lithium metal layer 25, the charging is conducted once at 0.01 C to 0.2 C in a voltage range of 4.5 V to 2.5 V. When the charging is conducted at a voltage level of less than the above-mentioned range, the lithium metal layer 25 is difficult to form, and when the voltage level is greater than the above-mentioned range on the contrary, the battery (cell) is damaged, and charge and discharge are not properly progressed after over-discharge occurs.

The lithium metal layer 25 formed above forms a uniform continuous or discontinuous layer on the negative electrode current collector 21. As one example, when the negative electrode current collector 21 has a foil form, a continuous thin-film form may be obtained, and when the negative electrode current collector 21 has a three-dimensional porous structure, the lithium metal layer 25 may be discontinuously formed. In other words, the discontinuous layer means a form of being discontinuously distributed having, in a specific region, a region having the lithium metal layer 25 and a region not having the lithium metal layer 25 present, and by the region not having lithium metal layer 25 being distributed to isolate, disconnect or separate the region having the lithium compound as an island-type, the region having the lithium metal layer 25 is distributed without continuity.

The lithium metal layer 25 formed through such charge and discharge has a thickness of a minimum of 50 nm or greater, 100 μm or less, and preferably 1 μm to 50 μm to function as a negative electrode. When the thickness is less than the above-mentioned range, battery charge and discharge efficiency rapidly decrease. When the thickness is greater than the above-mentioned range on the contrary, lifetime properties and the like are stable, however, there is a problem in that battery energy density decreases.

Particularly, by being manufactured to a negative electrode free battery with no lithium metal when assembling a battery, the lithium metal layer 25 provided in the present invention has no or little oxide layer formed thereon caused by high reactivity of the lithium generated during the assembling process, compared to an existing lithium secondary battery assembled using lithium foil. As a result, a lifetime degradation of a battery caused by the oxide layer may be prevented.

In addition, the lithium metal layer 25 moves by charge of the highly irreversible material, and this may form a more stable lithium metal layer 25 compared to forming a lithium metal layer 25 on a positive electrode. When attaching lithium metal on a positive electrode, a chemical reaction between the positive electrode and the lithium metal may occur.

The positive electrode mixture 13 is formed including the positive electrode active material and the lithium metal compound, and herein, the positive electrode mixture 13 may further include a conductor, a binder, and other additives commonly used in a lithium secondary battery.

The conductor is used for further enhancing conductivity of the electrode active material. Such a conductor is not particularly limited as long as it has conductivity without inducing chemical changes to the corresponding battery, and for example, graphite such as natural graphite or artificial graphite; carbon black such as carbon black, acetylene black, ketjen black, channel black, furnace black, lamp black and thermal black; conductive fibers such as carbon fiber or metal fiber; fluorocarbon; metal powders such as aluminum and nickel powder; conductive whiskers such as zinc oxide and potassium titanate; conductive metal oxides such as titanium oxide; polyphenylene derivatives, and the like may be used.

The binder may be further included for binding of the positive electrode active material, the lithium metal compound and the conductor, and binding for the current collector. The binder may include a thermoplastic resin or a thermosetting resin. For example, polyethylene, polypropylene, polytetrafluoroethylene (PTFE), polyvinylidene fluoride (PVDF), styrene-butadiene rubber, a tetrafluoroethylene-perfluoroalkyl vinyl ether copolymer, a fluorovinylidene-hexafluoropropylene copolymer, a fluorovinylidene-chlorotrifluoroethylene copolymer, an ethylene-tetrafluoroethylene copolymer, polychlorotrifluoroethylene, a fluorovinylidene-pentafluoropropylene copolymer, a propylene-tetrafluoroethylene copolymer, an ethylene-chlorotrifluoroethylene copolymer, a fluorovinylidene-hexafluoropropylene-tetrafluoroethylene copolymer, a fluorovinylidene-perfluoromethyl vinyl ether-tetrafluoroethylene copolymer, an ethylene-acrylic acid copolymer and the like may be used either alone or as a mixture, however, the binder is not limited thereto, and those that may be used as a binder in the art may all be used.

Examples of the other additives may include a filler. The filler is selectively used as a component suppressing electrode expansion, and is not particularly limited as long as it is a fibrous material without inducing chemical changes to the corresponding battery. For example, olefin-based polymers such as polyethylene or polypropylene, or fibrous materials such as glass fiber or carbon fiber may be used.

The positive electrode mixture 13 of the present invention is formed on the positive electrode current collector 11.

The positive electrode current collector is generally prepared to a thickness of 3 μm to 500 μm. Such a positive electrode current collector 11 is not particularly limited as long as it has high conductivity without inducing chemical changes to a lithium secondary battery, and for example, stainless steel, aluminum, nickel, titanium, baked carbon, or aluminum or stainless steel of which surface is treated with carbon, nickel, titanium, silver or the like, and the like may be used.

Herein, in order to increase adhesive strength with the positive electrode active material, the positive electrode current collector 11 may be used in various forms such as films, sheets, foil, nets, porous bodies, foams or non-woven fabrics having micro unevenness formed on the surface.

The method of coating the positive electrode mixture 13 on the current collector may include a method of distributing electrode mixture slurry on the current collector and uniformly dispersing the result using a doctor blade and the like, a method of die casting, comma coating, screen printing, and the like. In addition, the electrode mixture slurry may be bonded to the current collector using a method of pressing or lamination after being molded on a separate substrate, however, the method is not limited thereto.

As illustrated in the structure of FIG. 3, the lithium secondary battery includes a positive electrode 10, a negative electrode 20 and a separator 30 provided therebetween, and depending on the battery type, the separator 30 may not be included.

Herein, the separator 30 may be formed with a porous substrate, and as the porous substrate, porous substrates commonly used in an electrochemical device may all be used, and for example, polyolefin-based porous membranes or non-woven fabrics may be used. However, the separator is not particularly limited thereto.

The separator 30 according to the present invention is not particularly limited in the material, and those commonly used as a separator 30 in a lithium secondary battery as a material physically separating a positive electrode and a negative electrode and having electrolyte and ion permeability may be used without particular limit. However, as a porous, non-conducting or insulating material, those having an excellent electrolyte moisture retention ability while having low resistance for ion migration of the electrolyte are particularly preferred. For example, polyolefin-based porous membranes or non-woven fabrics may be used. However, the separator is not particularly limited thereto.

Examples of the polyolefin-based porous membrane may include membranes formed with a polyolefin-based polymer such as polyethylene such as high density polyethylene, linear low density polyethylene, low density polyethylene and ultra-high molecular weight polyethylene, polypropylene, polybutylene and polypentene alone, or formed with a polymer mixing these.

Examples of the non-woven fabric other than the polyolefin-based non-woven fabric may include non-woven fabrics formed with polyphenylene oxide, polyimide, polyamide, polycarbonate, polyethylene terephthalate, polyethylene naphthalate, polybutylene terephthalate, polyphenylene sulfide, polyacetal, polyethersulfone, polyetheretherketone, polyester and the like alone, or formed with a polymer mixing these, and such a non-woven fabric has a fiber form forming a porous web, and includes spunbond or meltblown form formed with long fibers.

The thickness of the separator 30 is not particularly limited, but is preferably in a range of 1 μm to 50 μm, and more preferably in a range of 5 μm to 30 μm. When the separator 30 has a thickness of less than 1 μm, a short is very likely to occur during battery charge and discharge, and when the thickness is greater than 50 μm, there are problems in that the electrolyte filling pores of the separator needs to be injected in excess and battery energy density decreases.

A pore size and porosity of the separator 30 are not particularly limited, however, the pore size is preferably from 0.1 μm to 50 μm, and the porosity is preferably from 10% to 95%. When the separator 30 has a pore size of less than 0.1 μm or porosity of less than 10%, the separator 30 functions as a resistive layer, and when the pore size is greater than μm or the porosity is greater than 95%, mechanical properties may not be maintained.

The shape of the lithium secondary battery described above is not particularly limited, and examples thereof may include a jelly-roll type, a stack type, a stack-folding type (including stack-Z-folding type) or a lamination-stack type, and may preferably be a stack-folding type.

After preparing an electrode assembly having the positive electrode, the separator and the negative electrode consecutively laminated, the electrode assembly is placed in a battery case, the electrolyte is injected to the top of the case, and the result is sealed with a cap plate and a gasket and then assembled to manufacture a lithium secondary battery.

Herein, depending on the positive electrode material and the separator type, the lithium secondary battery may be divided into various batteries such as a lithium-sulfur battery, a lithium-air battery, a lithium-oxide battery or a lithium all-solid-state battery, and depending on the shape, may be divided into a cylinder-type, a square-type, a coin-type, a pouch-type and the like, and depending on the size, may be divided into a bulk type and a thin film type. Structures and manufacturing methods of these batteries are widely known in the art, and therefore, detailed descriptions thereof are not included.

The lithium secondary battery according to the present invention may be used as a power supply of devices requiring high capacity and high rate properties. Specific examples of the device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including e-bikes, e-scooters and the like; electric golf carts; systems for power storage and the like, but are not limited thereto.

Hereinafter, preferred examples are provided in order to illuminate the present invention, however, the following examples are for illustrative purposes only, and it is obvious to those skilled in the art that various modifications and changes may be made within the scope of category and technological ideas of the present invention, and such modifications and changes also belong to the attached claims.

Manufacture of Negative Electrode Free Lithium Secondary Battery

Example 1

LCO ($LiCoO_2$) and $L_2N$ ($Li_2NiO_2$) mixed in a weight ratio of 9:1 in N-methyl-2-pyrrolidone was used as a positive electrode active material, and after mixing the positive electrode active material:conductor (super-P):binder (PVdF) in a weight ratio of 95:2.5:2.5, the result was mixed for 30 minutes using a paste face mixer to prepare a slurry composition.

The slurry composition prepared above was coated on a current collector (Al Foil, thickness 20 μm), and dried for 12 hours at 130° C. to prepare a positive electrode having a loading amount of 3 mAh/cm$^2$.

After mixing polyethylene oxide (PEO) and LiFSI so that EO:Li have a molar ratio of 20:1, $LiNO_3$ was added thereto to prepare a first protective layer, and this was transferred to a copper current collector (negative electrode current collector) surface to form the first protective layer on the copper current collector.

After coating polyvinylidene fluoride (PVDF) on one surface of a release film (SKC Hass) to a thickness of 200 nm, Cu was vacuum deposited thereon. When Cu was vacuum deposited on the PVDF coating layer, the Cu particles penetrated into the PVDF coating layer resulting in a form of the Cu particles being inserted inside the PVDF coating layer. The Cu particles inserted into the PVDF coating layer are electrically connected with each other to form a Cu matrix in a three-dimensional structure form having space formed inside.

Accordingly, when vacuum depositing Cu after forming the PVDF coating layer on the release film, a layer having a form in which inner space of the three-dimensional structure formed by the Cu is filled with PVDF is formed, and the copper is employed as a second protective layer and the PVDF is employed as a third protective layer. Herein, a weight ratio of the Cu and the PVDF was 50:50 in the second protective layer and the third protective layer.

The second and the third protective layers formed on the release film were transferred to one surface of the first protective layer to form the first to the third protective layers on the copper current collector.

A solution obtained by dissolving 1 M of $LiPF_6$ and 2% by weight of vinylene carbonate (VC) in a mixed solvent mixing ethylene carbonate (EC), diethyl carbonate (DEC) and dimethyl carbonate (DMC) in a volume ratio of 1:2:1 was used as an electrolyte.

As a result, a negative electrode free lithium secondary battery of Example 1 including the negative electrode current collector, the first to the third protective layers, the electrolyte, a separator and the positive electrode was manufactured.

Herein, the separator had porosity of 48.8%.

Example 2

A negative electrode free lithium secondary battery of Example 2 was manufactured in the same manner as in Example 1 except that germanium (Ge) was used as the second protective layer.

Example 3

A negative electrode free lithium secondary battery of Example 3 was manufactured in the same manner as in Example 1 except that L$_2$N (Li$_2$NiO$_2$) was not used as the positive electrode active material.

Comparative Example 1

A negative electrode free lithium secondary battery of Comparative Example 1 was manufactured in the same manner as in Example 1 except that the second and the third protective layers were not included. In other words, the negative electrode free lithium secondary battery of Comparative Example 1 included only the first protective layer.

Comparative Example 2

A negative electrode free lithium secondary battery of Comparative Example 2 was manufactured in the same manner as in Example 1 except that the first and the second protective layers were not included. In other words, the negative electrode free lithium secondary battery of Comparative Example 2 included only the third protective layer.

Comparative Example 3

A negative electrode free lithium secondary battery of Comparative Example 3 was manufactured in the same manner as in Example 1 except that the second protective layers was not included. In other words, the negative electrode free lithium secondary battery of Comparative Example 3 included only the first and the third protective layers.

Comparative Example 4

A negative electrode free lithium secondary battery of Comparative Example 4 was manufactured in the same manner as in Example 1 except that the first to the third protective layers were not included, and L$_2$N (Li$_2$NiO$_2$) was not used as the positive electrode active material. In other words, the negative electrode free lithium secondary battery of Comparative Example 4 included none of the first to the third protective layers.

Experimental Example 1. Analysis on Properties of Lithium Secondary Battery

Each of the negative electrode free lithium secondary batteries manufactured in Examples 1 to 3, and Comparative Examples 1 to 4 was charged once at 0.1 C and 4.25 V of CC/CV (5% current cut at 1 C) to manufacture a lithium metal layer-formed lithium secondary battery.

Each of the lithium secondary batteries was charged and discharged at a temperature of 60° C. under a condition of 0.2 C/0.5 C based on discharge of 3 mAh/cm$^2$, and the number of cycles of the lithium metal layer (25)-formed lithium secondary battery when a capacity retention rate was 50% or greater with respect to initial discharge capacity was measured. The results are shown in the following Table 2.

TABLE 2

|  | First Protective Layer | Second Protective Layer | Third Protective Layer | Use of L$_2$N | Short Occurrence | Number of Cycles When Capacity Retention Rate Was 50% or Greater with Respect to Initial Discharge Capacity |
|---|---|---|---|---|---|---|
| Example 1 | ○ | ○ | ○ | ○ | X | 27 |
| Example 2 | ○ | ○ | ○ | ○ | X | 22 |
| Example 3 | ○ | ○ | ○ | X | X | 9 |
| Comparative Example 1 | ○ | X | X | ○ | ○ | 5 (Stopped when Short Occurred) |
| Comparative Example 2 | X | X | ○ | ○ | ○ | 4 (Stopped when Short Occurred) |
| Comparative Example 3 | ○ | X | ○ | ○ | ○ | 6 (Stopped when Short Occurred) |
| Comparative Example 4 | X | X | X | X | ○ | 3 (Stopped when Short Occurred) |

From the results of Table 2, a short did not occur and the number of cycles when a capacity retention rate was 50% or greater with respect to initial discharge capacity was measured to be high of 27 and 22 cycles in Examples 1 and 2 including all of the first to the third protective layers and using L$_2$N, a highly irreversible material. In Example 3, L$_2$N, a highly irreversible material, was not used, and although a short did not occur, the number of cycles when a capacity retention rate was 50% or greater with respect to initial discharge capacity was measured to be low of 9 cycles.

On the other hand, in all of Comparative Examples 1 to 4 that did not include one or more of the first to the third protective layers, or included none of the first to the third protective layers, a short occurred, and very unstable charge and discharge properties were obtained.

REFERENCE NUMERAL

10: Positive Electrode

11: Positive Electrode Current Collector

13: Positive Electrode Mixture

20: Negative Electrode

21: Negative Electrode Current Collector

22: First Protective Layer

23: Second Protective Layer

24: Third Protective Layer

25: Lithium Metal Layer

30: Separator

The invention claimed is:

1. A lithium secondary battery comprising:
a positive electrode;
a negative electrode;
a lithium metal layer; and
an electrolyte disposed between the positive electrode and the negative electrode,
wherein the negative electrode comprises a first protective layer formed on a negative electrode current collector, a second protective layer formed on the first protective layer opposite the negative electrode current collector, and a third protective layer formed inside and on one surface of the second protective layer opposite the first protective layer;
wherein the lithium metal layer is formed between the negative electrode current collector and the first protective layer in the negative electrode when lithium ions migrate from the positive electrode after charging,
wherein the second protective layer comprises a three-dimensional Cu structure,
wherein lithium dendrite is present inside the first protective layer, and
the first protective layer has a higher ion conductivity than the third protective layer,
wherein the positive electrode comprises a lithium metal compound represented by any one of the following Chemical Formulae 4 to 8:

$$Li_2M^4O_2 \qquad \text{[Chemical Formula 4]}$$

in Chemical Formula 4, $M^4$ is Cu, $$Li_{3+f}Nb_{1-g}M^5_{g}S_{4-h} \qquad \text{[Chemical Formula 5]}$$

in Chemical Formula 5, $-0.1 \le f \le 1$, $0 \le g \le 0.5$, $-0.1 \le h \le 0.5$, and $M^5$ is an element of one or more types selected from the group consisting of Mn, Fe, Co, Cu, Zn, Mg and Cd, $$LiM^6_iMn_{1-i}O_2 \qquad \text{[Chemical Formula 6]}$$

in Chemical Formula 6, i is $0.05 \le i < 0.5$, and $M^6$ is an element of one or more types selected from the group consisting of Cr, Al, Ni, and Co, $$LiM^7_{2j}Mn_{2-2j}O_4 \qquad \text{[Chemical Formula 7]}$$

in Chemical Formula 7, j is $0.05 \le j < 0.5$, and $M^7$ is an element of one or more types selected from the group consisting of Cr, Al, Ni, and Co, and $$Li_k\text{-}M^8_m\text{-}N_n \qquad \text{[Chemical Formula 8]}$$

in Chemical Formula 8, $M^8$ represents an alkaline-earth metal, k/(k+m+n) is from 0.10 to 0.40, m/(k+m+n) is from 0.20 to 0.50, and n/(k+m+n) is from 0.20 to 0.50.

2. The lithium secondary battery of claim 1, wherein the lithium metal layer is formed through a one-time charge in a voltage range of 4.5 V to 2.5 V.

3. The lithium secondary battery of claim 1, wherein the first protective layer has an ion conductivity of $10^{-5}$ S/cm to $10^{-2}$ S/cm.

4. The lithium secondary battery of claim 1, wherein the first protective layer comprises one or more selected from the group consisting of a poly(vinylidene fluoride-co-hexafluoropropylene) (PVdF-HFP) polymer, a polyurethane-based polymer, a polyacryl-based polymer, a polyethylene polymer, a polyether-based polymer, a poly siloxane-based polymer, a polyethylene derivative, a polyethylene oxide derivative, a polypropylene oxide derivative, a phosphoric acid ester polymer polyalginate lysine, polyester sulfide, polyvinyl alcohol, polyvinylidene fluoride and a polymer including an ionic dissociation group.

5. The lithium secondary battery of claim 1, wherein the electrically conductive matrix further comprises a binder, and the binder is one or more selected from the group consisting of polyvinylidene fluoride, polyvinylidene fluoride-co-hexafluoropropylene, polyvinylidene fluoride-co-trichloroethylene, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, styrene-butadiene rubber, an acrylonitrile-styrene-butadiene copolymer and polyimide.

6. The lithium secondary battery of claim 1, wherein the third protective layer is formed on a pore inside the second protective layer and on the surface of the second protective layer opposite the first protective layer.

7. The lithium secondary battery of claim 1, wherein the third protective layer comprises an ion conducting polymer.

8. The lithium secondary battery of claim 1, wherein the third protective layer has an ion conductivity of $10^{-6}$ S/cm to $10^{-3}$ S/cm.

9. The lithium secondary battery of claim 1, wherein the positive electrode comprises one or more types of positive electrode active materials selected from the group consisting of $LiCoO_2$, $LiNiO_2$, $LiMnO_2$, $LiMn_2O_4$, $Li(Ni_aCo_bMn_c)O_2$ wherein $0<a<1$, $0<b<1$, $0<c<1$, and $a+b+c=1$, $LiNi_{1-Y}Co_YO_2$, $LiCo_{1-Y}MnYO_2$, $LiNi_{1-Y}Mn_YO_2$ wherein $0 \le Y < 1$, $Li(Ni_aCo_bMn_c)O_4$ wherein $0<a<2$, $0<b<2$, $0<c<2$, and $a+b+c=2$, $LiMn_{2-z}Ni_zO_4$, $LiMn_{2-z}Co_zO_4$ wherein $0<Z<2$, $Li_xM_yMn_{2-y}O_{4-z}A_z$ wherein $0.9 \le x \le 1.2$, $0<y<2$, $0 \le z<0.2$, M is one or more of Al, Mg, Ni, Co, Fe, Cr, V, Ti, Cu, B, Ca, Zn, Zr, Nb, Mo, Sr, Sb, W, Ti and Bi, and A is one or more anions of $-1$ or $-2$ valency, $Li_{1+a}Ni_bM'_{1-b}O_{2-c}A'_c$ wherein $0 \le a \le 0.1$, $0 \le b \le 0.8$, $0 \le c<0.2$, M' is one or more types selected from the group consisting of octahedral stable elements such as Mn, Co, Mg or Al, and A' is one or more anions of $-1$ or $-2$ valency, $LiCoPO_4$ and $LiFePO_4$.

10. The lithium secondary battery of claim 1, wherein the second protective layer and the third protective layer are comprised in a weight ratio of 3:7 to 7:3.

11. The lithium secondary battery of claim 1, wherein the second protective layer comprises PVDF inside spaces formed in the three-dimensional Cu structure.

12. The lithium secondary battery of claim 11, wherein a weight ratio of the PVDF to the Cu in the three-dimensional Cu structure is 50:50 in the second protective layer.

* * * * *